(12) United States Patent
Dronnik et al.

(10) Patent No.: US 9,238,411 B2
(45) Date of Patent: Jan. 19, 2016

(54) NON-RAIL-BOUND VEHICLE

(75) Inventors: Andrej Dronnik, Berlin (DE); Goeran Keil, Schoenefeld (DE); Georg Kinnemann, Bestensee (DE); Stephan Rister, Nuremberg (DE); Thomas Sachse, Bruckmuehl (DE); Thomas Zinken, Mechernich (DE)

(73) Assignee: Siemens Aktiengesellschaft, Munich (DE)

( * ) Notice: Subject to any disclaimer, the term of this patent is extended or adjusted under 35 U.S.C. 154(b) by 70 days.

(21) Appl. No.: 14/122,763

(22) PCT Filed: May 23, 2012

(86) PCT No.: PCT/EP2012/059607
§ 371 (c)(1),
(2), (4) Date: Dec. 5, 2013

(87) PCT Pub. No.: WO2012/163761
PCT Pub. Date: Dec. 6, 2012

(65) Prior Publication Data
US 2014/0138200 A1   May 22, 2014

(30) Foreign Application Priority Data
May 27, 2011 (DE) .......................... 10 2011 076 615

(51) Int. Cl.
*B60L 5/00* (2006.01)
*B60L 5/19* (2006.01)
(Continued)

(52) U.S. Cl.
CPC ... *B60L 5/19* (2013.01); *B60L 5/08* (2013.01); *B60L 5/36* (2013.01); *B60L 11/1837* (2013.01);
(Continued)

(58) Field of Classification Search
CPC .............. B60L 5/08; B60L 5/19; B60L 5/36; B60L 11/1837; B60L 2200/26; Y02T 10/7005; Y02T 90/14; Y02T 90/128; Y02T 10/7088
USPC ................................................ 191/59.1–60.5
See application file for complete search history.

(56) References Cited

U.S. PATENT DOCUMENTS 1,828,945 A * 10/1931 Rossman ........................ 191/3
3,998,305 A    12/1976 Torok
(Continued)

FOREIGN PATENT DOCUMENTS

| CN | 1332677 A   | 1/2002 |
|----|-------------|--------|
| DE | 2500121 A1  | 7/1975 |

(Continued)

*Primary Examiner* — Jason C Smith
(74) *Attorney, Agent, or Firm* — Laurence Greenberg; Werner Stemer; Ralph Locher

(57) ABSTRACT

A non-rail-bound vehicle, truck or bus, includes a current collector feeding electrical energy from an overhead line installation having a contact wire. The collector has a contact strip with a working region contacting the contact wire. An actuating device coupled to the collector adjusts the contact strip. The contact strip is horizontal and adjustable transversely to a vehicle longitudinal axis. A sensor senses the position of the vehicle relative to the contact wire. A control device connected to the sensor and the actuating device actuates the actuating device based on the sensed vehicle position, so that the contact strip maintains contact with the contact wire within its working range. The vehicle thus reliably maintains contact with the contact wire through the collector during operation on multilane roadways with an at least partially electrified lane, even at relatively high speeds of, for example, 80 to 100 km/h.

11 Claims, 2 Drawing Sheets

(51) Int. Cl.
  *B60L 5/08*     (2006.01)
  *B60L 5/36*     (2006.01)
  *B60L 11/18*    (2006.01)

(52) U.S. Cl.
  CPC .......... *B60L 2200/26* (2013.01); *Y02T 10/7005* (2013.01); *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 5,124,510 A * | 6/1992 | Garfinkle | 191/65 |
| 5,954,171 A * | 9/1999 | Gramatke et al. | 191/60.3 |
| 6,273,001 B1 | 8/2001 | Amigot et al. | |
| 6,474,455 B1 * | 11/2002 | Blaschko et al. | 191/45 R |
| 6,591,953 B2 * | 7/2003 | Blanvillain | 191/60.2 |
| 2011/0106349 A1 * | 5/2011 | Sakita | 701/22 |
| 2013/0105264 A1 * | 5/2013 | Ruth et al. | 191/59.1 |
| 2014/0005871 A1 * | 1/2014 | Saito et al. | 701/22 |
| 2014/0041951 A1 * | 2/2014 | Tojima et al. | 180/2.1 |
| 2014/0097054 A1 * | 4/2014 | Francke et al. | 191/59.1 |
| 2014/0138200 A1 * | 5/2014 | Dronnik et al. | 191/59.1 |
| 2014/0195091 A1 * | 7/2014 | Saito | 701/22 |
| 2014/0224609 A1 * | 8/2014 | Saito et al. | 191/59.1 |

FOREIGN PATENT DOCUMENTS

| | | |
|---|---|---|
| DE | 2600158 A1 | 7/1976 |
| DE | 3244945 C1 | 1/1984 |
| DE | 69215698 T2 | 5/1997 |
| DE | 10256705 A1 | 7/2004 |
| DE | 102007016841 A1 | 10/2008 |
| DE | 102008045865 A1 | 3/2010 |
| GB | 14803011 | 7/1977 |
| GB | 2463701 A | 3/2010 |
| WO | 2011015724 A2 | 2/2011 |

\* cited by examiner

NON-RAIL-BOUND VEHICLE

BACKGROUND OF THE INVENTION

Field of the Invention

The invention relates to a non-rail-bound vehicle in particular a truck or bus, including a current collector for feeding in electrical energy from an overhead line installation having at least one contact wire. The current collector has at least one contact strip with a working range for making contact with the at least one contact wire. An actuating device is coupled to the current collector for adjusting the at least one contact strip. The at least one contact strip is oriented horizontally and can be adjusted transversely with respect to a vehicle longitudinal axis. A sensor senses the position of the vehicle relative to the at least one contact wire. A control device is connected to the sensor and the actuating device and is configured to actuate the actuating device as a function of the vehicle position sensed by the sensor, in such a way that the at least one contact strip maintains the contact with the at least one contact wire within its working range.

To enable traction current to be supplied, it is well known for rail-bound vehicles such as, for example, electric locomotives, trains and streetcars, to be equipped with current collectors which are in contact with a contact wire of an overhead contact system for feeding electrical energy into the vehicle. A defined relative position may be maintained between the at least one contact wire and the rail vehicle thanks to the track guidance of the rails, which in normal operation enables the reliable maintenance of a sliding contact between the current collector and the contact wire. An external power supply is far less common in electrically powered vehicles which are not rail-bound.

Thus a bipolar overhead line installation for electrically propelled vehicles for local public transportation is known, for example, from the patent specification DE 32 44 945 C1. Of the two overhead wires running in parallel, one is live to earth and the other serves as a neutral conductor. A trolleybus is equipped with a pair of pantographs in order to be able to operate in the overhead line installation. During operation the pair of pantographs occupies an engaged state relative to the horizontal, their contact shoes being duly applied to the two overhead wires. The pantograph rods are subject to the force of an uprighting spring which ensures the necessary contact pressure of the contact shoes on the overhead wires. The pantographs are articulated around a horizontal axis transverse overhead wires, the pantographs can also be rotated around a vertical axis in order to be able to maintain sliding contact with the overhead wires. However, trolleybuses are rail-bound vehicles because abrupt evasive maneuvers or overtaking maneuvers which require leaving the roadway result in a loss of contact between the pantographs and the overhead wires.

The published patent application DE 102 56 705 A1 discloses a non-rail-bound vehicle, like the trucks used in open-cast mining to transport ore, coal or spoil. There are two pantographs for the supply of an electric motor of the vehicle which are in contact with contact wires of a bipolar overhead line via contact strips during operation. In order that the vehicle is only ever steered in such a way as to prevent the contact strips leaving the contact wires, sensor strips bearing magnetic field sensors are arranged on the pantographs. These determine the magnetic field strength of the magnetic field generated by the current in the contact wire with such accuracy that the distance of the sensor from the contact wire can be determined on the basis of the measured field strength value. The information about the position of the sensor relative to the contact wire and thereby about the position of the pantograph and thereby of the entire vehicle relative to the contact wire can be communicated to the vehicle driver by means of a display unit so that he can perform appropriate steering movements immediately. It is also possible to supply the information from the sensors to a control unit for the automatic steering of the vehicle.

The pantographs known from trolleybuses have the disadvantage that it is relatively difficult to connect and disconnect the wires to and from vehicles and that sudden steering movements may result in so-called rod derailments, i.e. in a loss of contact between the contact shoes and the overhead wires. As a result, this system is unsuitable for roadways with an at least partially electrified traffic lane with non-electrified traffic lanes running in parallel therewith—for example, on multi-lane freeways. Finally, pantographs are also unreliable at relatively high speeds of 80 to 100 km/h, at which commercial vehicles may drive on freeways.

The solutions known from open-cast mining vehicles with one current collector each per contact wire also have the disadvantage that lateral movements of the vehicle in excess of 0.4 m may result in a loss of contact with the overhead line. In order to avoid such losses of contact, the current collector arrangement can also be designed so that it is wider than the vehicle, which is dangerous on public roads outside an open-cast mining area and is not permitted under road traffic regulations.

BRIEF SUMMARY OF THE INVENTION

It is therefore the object of the invention to provide a generic vehicle with a current collector which can also be reliably connected and disconnected at relatively high speeds of, for example, 80 to 100 km/h and can reliably maintain contact with the contact wire during operation on multi-lane roadways with an at least partially electrified traffic lane.

The object is achieved according to the invention by a non-rail-bound vehicle in particular a truck or bus, including a current collector for feeding in electrical energy from an overhead line installation having at least one contact wire. The current collector has at least one contact strip with a working range for making contact with the at least one contact wire. An actuating device is coupled to the current collector for adjusting the at least one contact strip. The at least one contact strip is oriented horizontally and can be adjusted transversely with respect to a vehicle longitudinal axis. A sensor senses the position of the vehicle relative to the at least one contact wire. A control device is connected to the sensor and the actuating device and is configured to actuate the actuating device as a function of the vehicle position sensed by the sensor, in such a way that the at least one contact strip maintains the contact with the at least one contact wire within its working range. The actuating device has an actuator and a linearly guided actuator rod, in which the actuator rod is coupled to the current collector and can be displaced transversely with respect to the vehicle longitudinal axis by the actuator. The non-rail-bound vehicle therefore comprises a current collector for feeding in electrical energy from an overhead line installation having at least one contact wire. The current collector has at least one contact strip with a working region for making contact with the at least one contact wire. The current collector is coupled to actuating means which have the purpose of adjusting the at least one contact strip, wherein the at least one contact strip is oriented horizontally and can be adjusted transversely with respect to a vehicle longitudinal axis. Sensor means are used for sensing the position, in particular the deviation from the center of an overhead line, of the vehicle relative to the at least one contact wire. A control device which is connected to the sensor means and the actuating means is designed to actuate the actuating means as a function of a comparison of the vehicle position sensed by the sensor means in such a way that the at least one contact strip maintains the contact with the at least one contact wire within its working range. The actuating means have an actuator and a linear actuator rod, wherein the actuator rod is connected to the current collector and can be displaced transversely with respect to the vehicle longitudinal axis by means of the actuator. As a result, the adjusting movement can be performed quickly and precisely using robust electromechanical components. The actuator rod may, for example, have a rack section which engages with a gear wheel which is connected in a rotatably fixed manner to a shaft of the actuator. The working range of a contact strip may extend over a section of the oblong carbon contact piece. The sensor means, control device and actuating means thus form a control circuit for the continuous tracking of the one or more contact strips of the current collector, wherein an actuating variable is calculated as a function of the actual position of the vehicle for the actuating means, on the basis of which a travel-related deviation from a target position in the working range of the contact strips is compensated by means of lateral displacement. The contact strips can be displaced transversely with respect to the vehicle longitudinal axis by means of appropriate arrangement and articulation of the current collector on the vehicle. Thus, the active current collector control system automatically compensates for inaccuracies in track guidance by the vehicle driver within certain limits, as a result of which the maintenance of the sliding contact between the current collector and contact wire is guaranteed even in the case of relatively high vehicle speeds and minor evasive maneuvers.

In an advantageous embodiment of the vehicle according to the invention, the actuating means have an actuator and a linear actuator rod, wherein the actuator rod is connected to the current collector and can be displaced transversely with respect to the vehicle longitudinal axis by means of the actuator. In this embodiment the adjusting movement can be performed quickly and precisely using robust electromechanical components. The actuator rod may, for example, have a rack section which engages with a gear wheel which is connected in a rotatably fixed manner to a shaft of the actuator.

In an advantageous embodiment of the vehicle according to the invention, the actuating means have a measuring device for the determination of an actuator position, the control device being connected to the measuring device in order to also control the actuating means as a function of the particular actuator position. By means of the additional information about the current actuator position, in other words by means of the position of the actuator rod or the rotation angle of an engine shaft, for example, the control device can take into account the relative position of the at least one contact strip to the vehicle when ascertaining the necessary actuating variable. Thus, a control intervention via the actuating means is not necessary for every vehicle position or actuator position. In particular, by this means it is possible to arrange the sensor means on the mobile current collector, in the vicinity of the contact strips, for example, because in doing so the position of the contact strips in relation to the contact wires can be sensed immediately.

In a preferred embodiment of the vehicle according to the invention, the control device is designed to adjust the actuating means in such a manner that the at least one contact strip oscillates over its working range. To achieve uniform wear of the contact elements of the contact strips, during operation of the vehicle according to the invention the control device can move the current collector back and forth periodically in such a way that a contact strip is in uniform contact with the contact wire over its entire working range. As a result, this adjusting movement of the contact strips corresponds to the zigzag movement of a contact wire of a traditional overhead line installation, which could be dispensed with as a result of the adjusting options of vehicles according to the invention.

In another advantageous embodiment of the vehicle according to the invention, the control device is connected to a driver assistance system, by means of which a steering recommendation can be issued to a driver and/or an automatic steering intervention can be undertaken as a function of the determined actuator position and/or the sensed vehicle position. Thus, if a limit of the working range of a contact strip were critically approached and/or if there were a critical deviation of the vehicle from the center of the roadway or from the center of the overhead line as a result of the driver assistance system, an acoustic and/or optical warning signal with a recommendation to counter-steer could be issued. In the case of vehicles with an automatic steering assistant, it is also possible to connect this to the control device for track guidance along the overhead line installation in order to permit an automatic steering intervention to be undertaken.

In another preferred embodiment of the vehicle according to the invention, the sensor means have at least one measuring device for determining a field strength of a physical field generated by the at least one contact wire, in particular a magnetic field or an electrical field or an alternating electromagnetic field. The overhead line installation which is provided primarily for the supply of energy to vehicles according to the invention and into the contact wires of which electrical energy is therefore fed is used advantageously for the generation of a physical field. Measuring devices for determining the field strength of electromagnetic fields are available inexpensively on the market with sufficient measuring accuracy and range to obtain a measurement for the distance to the contact wire or to the contact wires via the field strength value at the location or at the locations of the sensor means. The relative position of the vehicle in relation to the overhead line installation can be derived from this.

Preferably the physical field is generated by the power supply into the overhead line installation for the supply of traction current to the vehicle. The electrical and magnetic field formed around the contact wires in any case with a direct current power supply or the electromagnetic alternating field emitted with an alternating current supply can be quite sufficient to obtain information about the relative position of the vehicle in relation to the overhead line installation by means of measurement of its field strength by the vehicle. No additional measures need be taken with regard to the overhead line. With direct voltages the a.c. components present as residual ripples therein can also be used advantageously to generate the physical measuring field.

In addition, the physical field is preferably generated by voltages or currents impressed into the at least one contact wire. To improve the measureable field strength values, higher-frequency voltages or currents superimposed on the traction voltage can be impressed.

Furthermore, the physical field is preferably generated by transmitter units arranged on the overhead line installation. Such transmitter units can be used if high-frequency voltages or currents in the MHz or GHz range are impressed as these only have a small range due to the emission.

In an additional advantageous embodiment of the vehicle according to the invention, the current collector for feeding in electrical energy is composed of an overhead line installation comprising two contact wires, the sensor means having two measuring devices arranged at a transverse distance for determination of the field strength, wherein the transverse distance is different from the distance between the contact wires. The transverse distance may be set to be smaller or greater than the contact wire distance. If the vehicle is located in the center beneath two contact wires of a bipolar overhead line installation, the field strength values measured by the two measuring devices are equal. Outside the center the field strength values are different. This makes it possible for the sensor means to detect whether the vehicle is deviating too far to the left or too far to the right from the center of the overhead line.

Additional advantages and properties of the vehicle according to the invention emerge from the following description of an exemplary embodiment which is explained in more detail on the basis of the drawings, which schematically show

DESCRIPTION OF THE INVENTION

Figure 1:
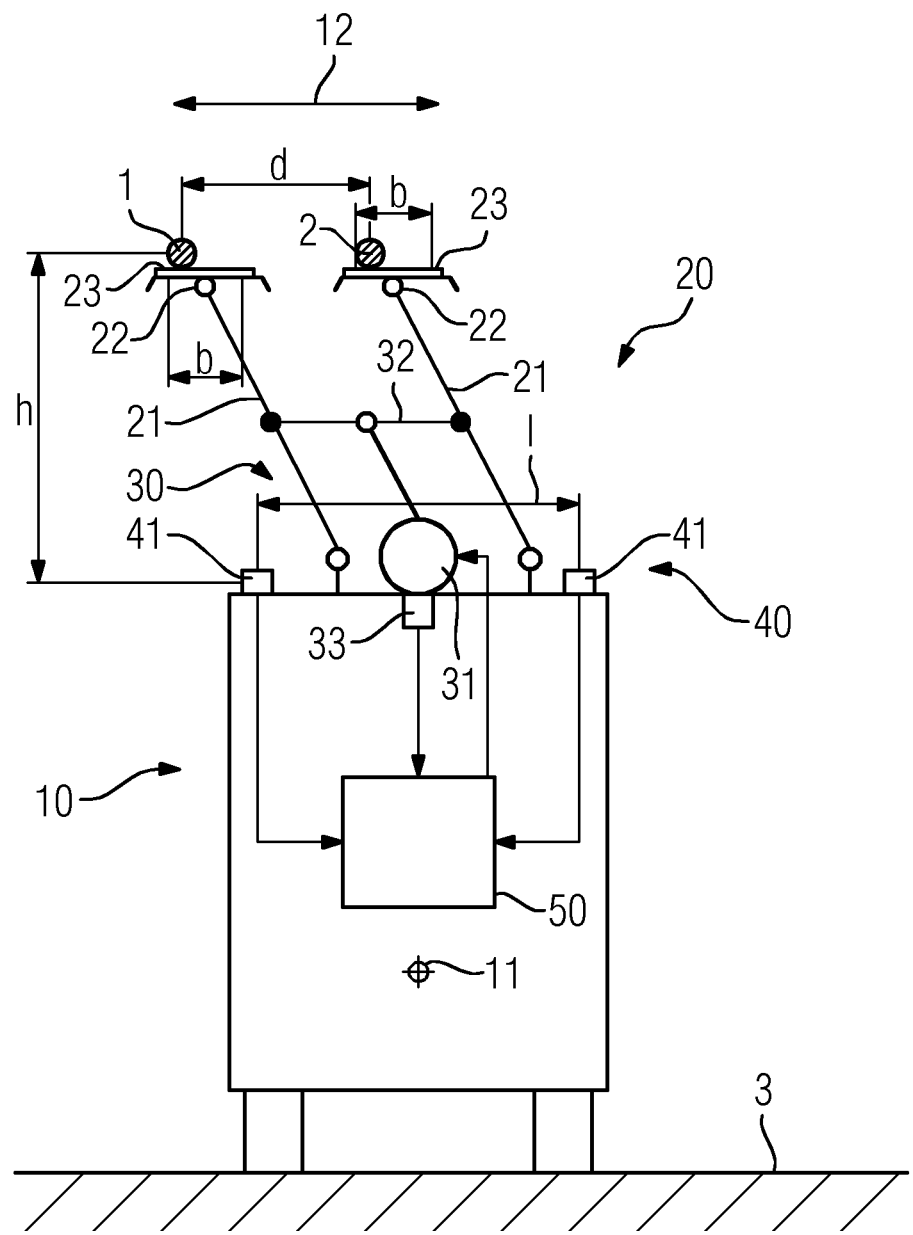
FIG. 1 a vehicle according to the invention in the direction of the vehicle longitudinal axis, FIG. 2 the mutual position of two contact wires and the sensor means of the vehicle in accordance with FIG. 1 and FIG. 3 the development of the field strength of the magnetic field generated by two contact wires at different heights below the contact wires.

In accordance with FIG. 1, a bipolar overhead line installation with a supply conductor 1 and a return conductor 2 in parallel with this is provided for the electrification of a traffic lane 3. Hereinafter the supply and return conductors 1 and 2 of the overhead line installation are also referred to individually as the contact wire or jointly as the contact wires. They are arranged by means of infrastructure facilities, such as masts, brackets, steady arms, load-bearing cables, hangers, etc., which are not shown, in approximately the center above the traffic lane 3. The traffic lane 3 may, for example, be the right hand lane of a multi-lane freeway. By this means it is possible to feed electrical energy into vehicles 10 using a current collector 20 in order to provide traction power to an electric or hybrid drive of the vehicle 10 or to discharge braking energy from the vehicle 10 to the overhead line installation.

With respect to a vehicle longitudinal axis 11 of the vehicle 10, the current collector 20 is arranged behind a driver's cab and in front of a load body which are not shown in detail. The current collector 20 has two support arms 21 arranged essentially vertically which are articulated on the vehicle 10 at their lower end and have a rocker 22 at their upper end. The support arms 21 lie in a swivel plane 12 which is essentially vertical to the vehicle longitudinal axis 11 and between the driver's cab and the body. Accordingly, in this swivel plane 12 the rockers 22 can therefore perform swiveling movements 12 laterally, in other words essentially horizontally and transversely to the vehicle longitudinal axis 11, in order to keep the contact strips 23 arranged on the rocker 22 in sliding contact with the contact wires 1 or 2.

The current collector 20 has two parallel support arms 21, each of which are articulated and can be rotated via a swivel joint on the vehicle 10. The swivel joints permit a rotating movement of the support arms 21 in a common swivel plane 12 which is formed by the drawing plane in FIG. 1; the axes of rotation of the swivel joints therefore extend in parallel to the vehicle longitudinal axis 11. The support arms 21 may have centering actuators (not shown), in order to be able to telescopically extend and retract them. The support arms 21 each have a rocker 22 arranged horizontally and transversely with respect to the vehicle longitudinal axis 11, which are connected via rotational joints to the upper ends of the piston rods of the centering actuators. The rockers 22 each comprise two contact strips 23 series-mounted in the direction of travel and mounted on a suspension system, on which there are contact elements and on the lateral ends of which pantograph horns are arranged sloping downwards. Each pair of series-mounted contact strips 23 is in contact with one of the contact wires 1 or 2. The rockers 22 can be rotated around a horizontal rocker shaft running transversely with respect to the vehicle longitudinal axis 11, in order to yield to tilting when a contact strip 23 is confronted with an obstacle on the contact wire 1 or 2. The two support arms 21 are connected by a horizontal actuator rod 32 which is linear in the swivel plane 12. The actuator rod 32 can be moved transversely with respect to the vehicle longitudinal axis 11 by means of an actuator 31 which is designed as a linear drive with a gearbox and is fastened to the vehicle 10. This adjusting movement is transferred to the support arms 21 via coupling joints. The actuating variable for the adjusting movement is predefined via a control system, comprising sensor means 40 for sensing the position of the vehicle 10 relative to the overhead line contact wires 1 or 2, actuating means 30 formed by the actuator rod 32 and actuator 31 and a control device 50 connected to the sensor means 40 and the actuating means 30.

Figure 2:
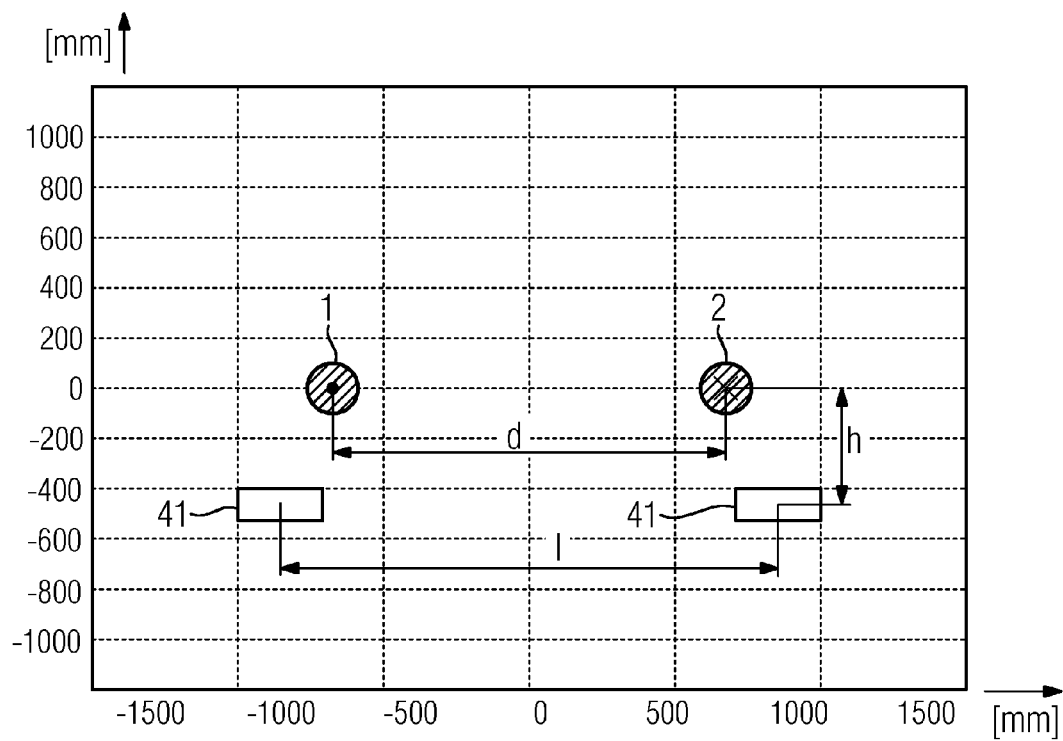
Figure 3:
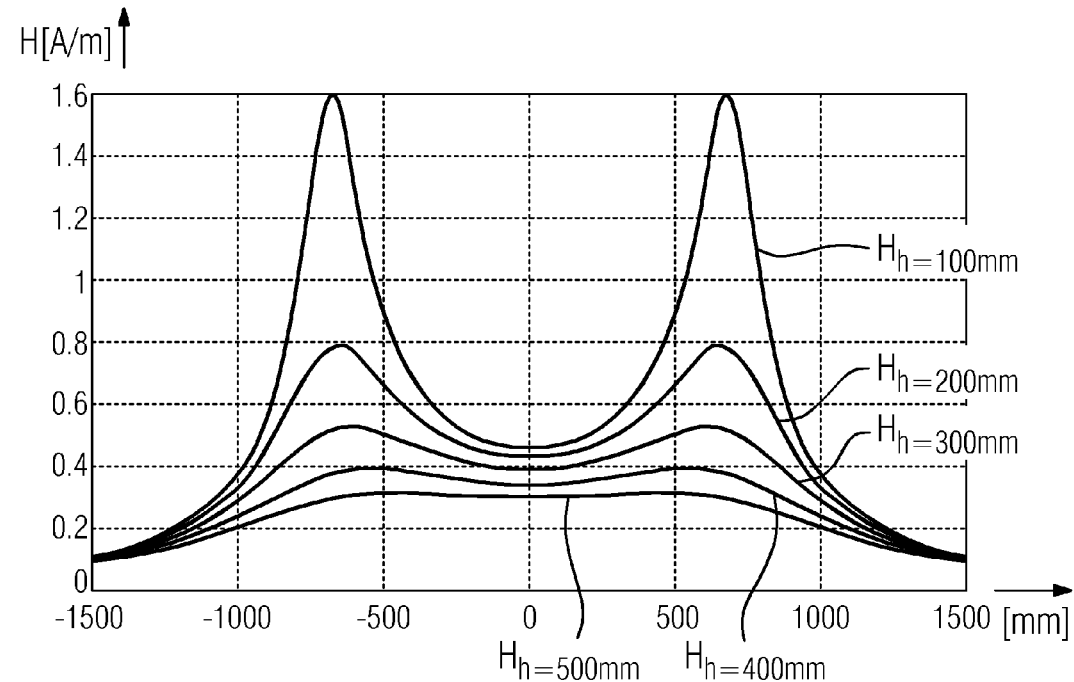

The sensor means 40 may, for example, comprise a video camera with image evaluation. In the exemplary embodiment shown, however, the sensor means 40 comprise two measuring devices 41 for the measurement of a magnetic field strength H of the magnetic field generated by the contact wires 1 or 2 at the location of the measuring devices 41. The magnetic field is measured, for example, by the voltage or current for traction current supply impressed into the contact wires 1 or 2. In accordance with FIG. 2, the transverse distance 1 of the two measuring devices 41 is set to be greater than the distance d of the two contact wires 1 or 2 from each other. The gradients of the magnetic field strength H shown in FIG. 3 are produced for various contact wire heights h, measured by the measuring devices 41 mounted on the vehicle roof. The smaller the contact wire height h is set, the more pronounced are the maxima at the positions of the contact wires 1 or 2. If the vehicle 10 travels in the center below the contact wires 1 or 2, both measuring devices 41 then measure the same magnetic field strength H. If the vehicle 10 travels off-center, the magnetic field strength measured by one measuring device 41 increases while the magnetic field strength of the other decreases and vice versa. Thus, the relative position of the vehicle 10 can be sensed with respect to the overhead line installation.

Furthermore, the actuating means 30 comprise a measuring device 33 for the determination of an actuator position, for example the present lateral shifting of the actuator rod 32, which in turn corresponds to an unequivocal contact strip position relative to the vehicle. The information about the actuator position and/or the vehicle position is continuously supplied to the control device 50. In the control device 50 the actuating means 30 are now actuated as a function of the vehicle position sensed by the sensor means 40, in such a way that the at least one contact strip 23 maintains the contact with the at least one contact wire 1 or 2 within its working range b. The control device 50 thus determines the way in which the rocker 22 must be laterally tilted so that the contact strips 23 are in contact with the contact wires 1 or 2 in its working range b. Such control interventions may be necessary in the event of driving inaccuracies but also in the event of evasive or overtaking maneuvers. They may also be necessary if the contact wires 1 or 2 are not centered above the traffic lane 3, as in the case of bends, for example.

As a rocker 22, and with it the contact strips 23, dip slightly in the case of a lateral adjusting movement 12, the centering actuators can be extended in order to compensate for this height loss. Retraction or extension of the centering actuators is therefore advantageous in enabling the contact wires 1 or 2 sagging between masts to be in contact with uniform pressure. Finally the extension and/or retraction of the centering actuators is for connection or disconnection to and from the wires when the vehicle 10 drives into the electrified traffic lane 3 or leaves it—for instance when entering, exiting or crossing freeways as well as during overtaking maneuvers or emergency stops at the curb. To compensate for longitudinal compressions, each support arm 21 has spring means (not shown) which are formed, for example, by pneumatic suspension. Apart from the damping achieved in this way, in addition the support arms 21 can also be raised and lowered. A gearbox is provided to transmit minor spring movements and larger raising or lowering movements of the support arms 21 and thereby of the contact strips 23. The spring means are designed in such a way that the contact strips 23 always press against the contact wires 1 or 2 with constant force. For electrical separation between the vehicle 10 and the current collector 20, the support arms 21 are each connected to the vehicle 10 via an electrical post insulator (not shown).

Overall, the current collector 20 can be reliably connected and disconnected to and from the wires and in the event of lateral relative movements between the vehicle 10 and overhead line installation of up to 0.4 m can reliably maintain the contact of the contact strips 23 with the contact wires 1 or 2. The U-shaped rocker 22 with contact strips 23 can also reliably use the overhead line installation at speeds of 80 to 100 km/h.

The invention claimed is:

1. A non-rail-bound vehicle, comprising:
a longitudinal vehicle axis;
a current collector configured to feed in electrical energy from an overhead line installation having at least one contact wire, said current collector including at least one contact strip configured to make contact with the at least one contact wire, said at least one contact strip having a working range, being oriented horizontally and being adjustable transversely with respect to said longitudinal vehicle axis, a rocker carrying said at least one contact strip, said current collector having two support arms being articulated, rotatable on the vehicle and configured to be swiveled transversely with respect to the longitudinal vehicle axis in a common swivel plane, said support arms being connected in an articulated manner to said rocker;
an actuating device coupled to said current collector for adjusting said at least one contact strip, said actuating device having an actuator and a linearly guided actuator rod coupled to said current collector and configured to be displaced transversely with respect to said longitudinal vehicle axis by said actuator;
a sensor configured to sense a position of the vehicle relative to the at least one contact wire; and
a controller connected to said sensor and to said actuating device and configured to actuate said actuating device as a function of the vehicle position sensed by said sensor to cause said at least one contact strip to maintain contact with the at least one contact wire within said working range.

2. The non-rail-bound vehicle according to claim 1, wherein said actuating device has a measuring device for determining an actuator position, and said controller is connected to said measuring device to actuate said actuating device as a function of a specific actuator position.

3. The non-rail-bound vehicle according to claim 1, wherein said controller is configured to actuate said actuating device to oscillate said at least one contact strip over said working range.

4. The non-rail-bound vehicle according to claim 1, wherein said controller is connected to a driver assistance system for at least one of issuing a steering recommendation to a driver or carrying out an automatic steering intervention as a function of at least one of a specific actuator position or the sensed vehicle position.

5. The non-rail-bound vehicle according to claim 1, wherein said sensor has at least one measuring device for measuring a field strength of a physical field generated by the at least one contact wire.

6. The non-rail-bound vehicle according to claim 5, wherein the physical field is a magnetic field or an electrical field or an alternating electromagnetic field.

7. The non-rail-bound vehicle according to claim 5, wherein the physical field is generated by a power supply to the overhead line installation for traction current supply of the vehicle.

8. The non-rail-bound vehicle according to claim 5, wherein the physical field is generated by voltages or currents additionally impressed into the at least one contact wire.

9. The non-rail-bound vehicle according to claim 5, wherein the physical field is generated by transmitter units on the overhead line installation.

10. The non-rail-bound vehicle according to claim 5, wherein:
said current collector is configured to feed in electrical energy from an overhead line installation having two contact wires disposed at a distance from each other;
said sensor has two measuring devices disposed at a transverse distance from each other for field strength determination; and
said transverse distance is different than the distance between the contact wires.

11. The non-rail-bound vehicle according to claim 1, wherein the non-rail-bound vehicle is a truck or a bus.

* * * * *